United States Patent
Zaretsky et al.

(10) Patent No.: US 7,353,415 B2
(45) Date of Patent: Apr. 1, 2008

(54) SYSTEM AND METHOD FOR POWER USAGE LEVEL MANAGEMENT OF BLADES INSTALLED WITHIN BLADE SERVERS

(75) Inventors: Lee B. Zaretsky, Austin, TX (US); Mukund P. Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 377 days.

(21) Appl. No.: 11/103,193

(22) Filed: Apr. 11, 2005

(65) Prior Publication Data

US 2006/0230299 A1    Oct. 12, 2006

(51) Int. Cl.
*G06F 1/00* (2006.01)
*G06F 1/26* (2006.01)
*G06F 1/32* (2006.01)

(52) U.S. Cl. ..................... 713/320; 713/300
(58) Field of Classification Search ............... 713/300, 713/320
See application file for complete search history.

(56) References Cited

U.S. PATENT DOCUMENTS

| 6,528,904 B1 | 3/2003 | Wong ........................ 307/140 |
| 7,051,215 B2 * | 5/2006 | Zimmer et al. ............. 713/300 |
| 7,228,441 B2 * | 6/2007 | Fung .......................... 713/300 |
| 2004/0030773 A1 | 2/2004 | Espinoza-Ibarra et al. .. 709/224 |
| 2004/0243798 A1 | 12/2004 | Goud et al. ................. 713/100 |
| 2004/0255171 A1 | 12/2004 | Zimmer et al. ............. 713/300 |
| 2005/0034000 A1 | 2/2005 | Lee ............................ 713/320 |

FOREIGN PATENT DOCUMENTS

GB    WO-93/19415    * 3/1993

* cited by examiner

*Primary Examiner*—James K. Trujillo
*Assistant Examiner*—Michael J Brown
(74) *Attorney, Agent, or Firm*—O'Keefe, Egan, Peterman & Enders, LLP

(57) ABSTRACT

Methods and systems are disclosed for power usage level management of blades installed in blade servers. When a new blade added is to a blade server, possible power usage levels for the new blade are assessed to determine possible effects on the total power usage level of the chassis. By assessing the different power usage levels, the chassis controller can then make intelligent decisions as to the power usage levels at which new blades will be allowed to operate while still keeping within chassis power supply capabilities. Blade power usage levels can be based upon a variety of considerations, including processor performance modes and blade configuration options.

19 Claims, 3 Drawing Sheets

SYSTEM AND METHOD FOR POWER USAGE LEVEL MANAGEMENT OF BLADES INSTALLED WITHIN BLADE SERVERS

TECHNICAL FIELD OF THE INVENTION

This invention relates to the operation of blades within blade servers and, more particularly, to power usage by blades within blade servers.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems are implemented as multiple processing components configured as part of a single system. A "blade" is a general term often used to refer to one component in a system that is designed to accept some number of components (referred to collectively as "blades"). Blades can be, for example, individual servers that plug into a single cabinet or chassis or individual port cards that add connectivity to a switch. Blades are often hot swappable hardware devices. A "blade server" is a general term often used to refer to a system architecture that houses multiple server modules or blades in a single chassis. Blade servers are widely used, for example, in data centers to save space and improve system management. Either self-standing or rack mounted, the chassis provides the power supply, and each blade has its own CPU, memory and hard disk. Redundant power supplies may also be provided. Blade servers generally provide their own management systems and may include a network or storage switch. With enterprise-class blade servers, disk storage is often external, and the blades are diskless. This approach allows for more efficient fail-over techniques because applications are not tied to specific hardware and a particular instance of the operating system. In such a solution, the blades are typically anonymous and interchangeable.

With the proliferation of blade servers, and as new generation of blades get developed, one recurring problem is the need to support next generation blades in existing chassis instead of requiring the purchase of new chassis for each generation of blade servers. Unfortunately, this problem is made more difficult because each new generation of blades typically consumes more power than the previous generation of blades. This increased power consumption is contributed primarily by newer, faster CPUs, memory technologies, etc. Traditional chassis controllers, however, do not adequately handle mixes of different generations of blades. For example, in a traditional chassis with capacity for ten (10) blades, if nine (9) blades of generation n, n+1, or mixture are present, and a new blade of generation n+1 is added to this chassis, this new blade will often be forced to remain powered down. In particular, the chassis controller firmware will query the BMC (baseboard management controller) or alike on the newly added blade to determine its maximum power consumption level. This maximum power consumption level will typically be relatively high compared to the blades for which the chassis was originally designed. If the addition of this new generation blade results in the total power usage level exceeding what the chassis power supply can provide, which is often the case, the chassis controller will not allow the newly added next-generation blade to operate. In short, existing chassis for blade servers do not efficiently handle power usage level management issues.

SUMMARY OF THE INVENTION

The present invention provides systems and methods for power usage level management of blades installed in blade servers. When a new blade added to a blade server, possible power usage levels for the new blade are assessed to determine possible effects on the total power usage level for the chassis. By assessing the different power usage levels, the chassis controller can then make intelligent decisions as to the power usage levels at which new blades will be allowed to operate while still keeping within chassis power supply capabilities. Blade power usage levels can be based upon a variety of considerations, including processor performance modes and blade configuration options.

In one embodiment, the present invention is a method for managing power usage levels for new blades installed in a blade server chassis, including initializing one or more blades within a chassis for a blade server, adding a new blade to a chassis that is configured to have two or more power usage levels, assessing a new total power usage level for the chassis based upon the possible power usage levels for the new blade, allowing a power usage level for the new blade that will keep the new total power usage level for the chassis below a maximum total power usage level for the chassis, and operating the new blade at the selected power usage level. As described below, other features and variations can be implemented, if desired, and a related systems can be utilized, as well.

In another embodiment, the present invention is a blade server having power management for multiple blades, including a chassis having a power supply and being configured to house a plurality of blades wherein each blade has a processor, a chassis power supply coupled to the chassis and configured to supply power to blades installed within the chassis, and a chassis controller coupled to the chassis, the chassis controller configured to control power levels for blades installed within the chassis. The chassis controller is further configured to assess new power usage levels for the chassis based upon possible power levels for a new blade that is capable of operating at two or more power usage levels and to select a power usage level for the new blade that will keep the new power usage level for the chassis below a maximum total power usage level for the chassis. As described below, other features and variations can be implemented, if desired, and related methods can be utilized, as well.

In another embodiment, the present invention is a blade for a blade server having power usage level reporting, including a baseboard management controller (BMC) configured to be coupled to a chassis controller for a blade server and to report to the chassis controller possible power usage levels for the blade, a central processing unit (CPU) configured to operate in multiple performance modes where each performance mode has an associated power usage level, and a BIOS (basic input/output system) device coupled to the BMC and to the CPU. The BIOS is configured to control the performance modes of the CPU and to request approval from the chassis controller through the BMC for the CPU to operate in successively higher performance modes until a request is denied. As described below, other features and variations can be implemented, if desired, and related methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a server computer system, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The present invention provides systems and methods for power usage level management of blade servers. Power levels for individual blades are analyzed, and each new blade added to a blade server chassis reports available power usage levels. The chassis controller can then make intelligent decisions as to the power usage level at which the new blade will be allowed to operate. Performance and configuration details of the blade, for example, can be analyzed to determine their individual or collective effect on the power consumption of the blade. By analyzing these details, the power management component of the chassis controller can make a more intelligent decision concerning the power needs of the blades in the chassis and, therefore, can better manage blade power usage levels and overall chassis power usage.

Figure 1:
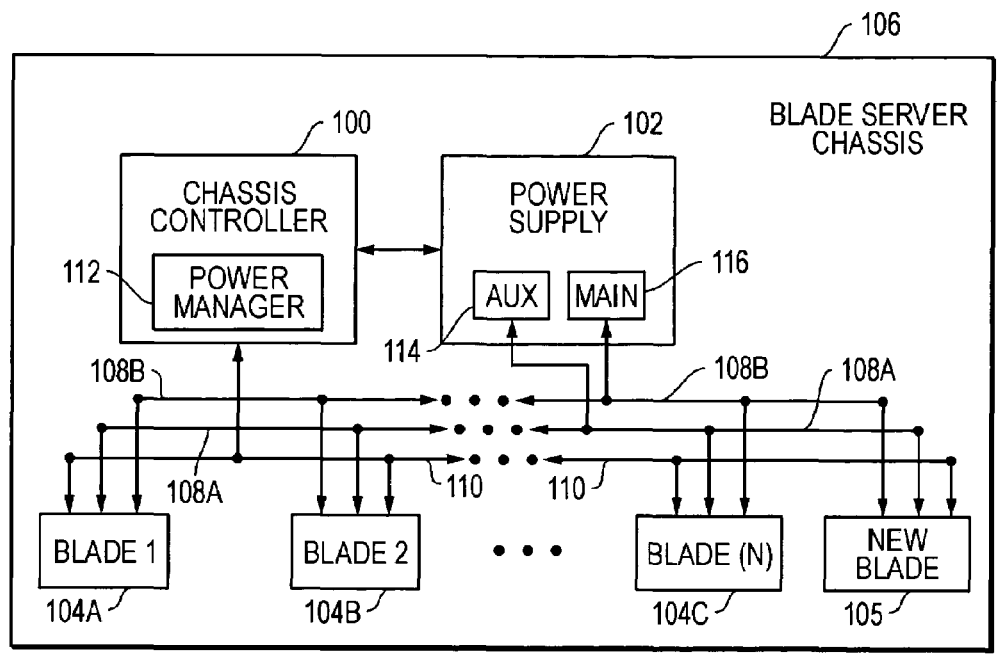
FIG. 1 is a block diagram for a blade array chassis including a chassis controller with power management features according to the present invention.

FIG. 1 is a block diagram for a blade server chassis 106 including a chassis controller 100 with power manager 112 according to the present invention. The chassis 106 can be configured to accept a plurality of blades, as represented by BLADE1 104A, BLADE2 104B . . . BLADE(N) 104C. NEW BLADE 105 represents a new blade that has been added to the chassis 106. The power manager 112 can communicate with the blades 104A, 104B . . . 104C through communication channels 110. In addition to the chassis controller 100, the chassis 106 can include a chassis power supply 102 that is coupled to the chassis controller 100. The chassis power supply 102 can include one or more power rails, such as auxiliary power rail (AUX) 114 and main power rail (MAIN) 116. As depicted, the auxiliary power rail (AUX) 114 provides power to the blades 104A, 104B . . . 104C, and 105 through connections 108A, and the main power rail (MAIN) 116 provides power to the blades 104A, 104B . . . 104C, and 105 through connections 108B. It is noted that the blades 104A, 104B . . . 104C, and 105 can be implemented using a wide variety of architectures and configurations.

Figure 2:
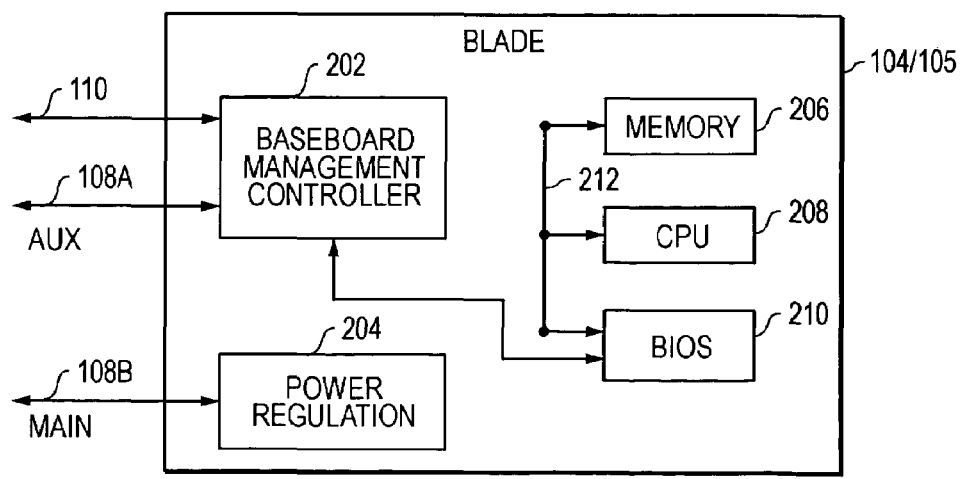
FIG. 2 is a block diagram for a blade.

FIG. 2 is a block diagram of an example embodiment for blade 104/105. In this example embodiment, the blade 104/105 includes a baseboard management controller (BMC) 202 coupled to a BIOS (basic input/output system) device 210, which can be, for example, a programmable device, such as an EEPROM (electrically erasable programmable read only memory). The BIOS device 210 communicates with and, in part, controls the operation of the components of the blade 104/105. The components can include, for example, a CPU (central processing unit) 208 and memory 206, as depicted. The BIOS device 210 communicates with the CPU 208 and the memory 206 through one or more buses 212 or other connections, as desired. The power regulation circuitry 204 for the blade 104/105 is connected to the main power rail (MAIN) 108B. And the BMC 202 is connected to the auxiliary power rail (AUX) 108A and the communication channel 110. The auxiliary power rail (AUX) 108A is typically utilized to power up the BMC 202 for communication with the chassis controller prior to powering up the blade itself through the main power rail (MAIN) 108B. The BMC 202 can then control how the blade powers up by sending appropriate commands and settings to the BIOS device 210, as desired.

It is noted that the blade 104/105 may have different power requirements for the main power rail (MAIN) 108B depending upon its components and its operation modes. Some CPUs, for example, can support multiple performance states, and these performance states can be configured such that lower performance states would use lower amounts of power, and higher performance states would use higher amounts of power. In addition, CPUs can be designed to power up, or come out of reset, in a particular performance state, for example, a low performance state. If and when higher performance is desired or needed, the BIOS device 210 can be configured to set a bit or register within the CPU to cause the CPU to start operating in a higher performance mode. Because lower performance modes typically do not use as much power as higher performance modes, these configurable CPUs will often consume less power than their maximum power ratings would require. Thus, blade power usage may be significantly lower where higher performance modes are not needed or used.

The blade power usage level management system of the present invention better manages usage of chassis power by recognizing the different operational modes and configurations for blades and their related power usage level needs. Rather than reserving the maximum power for each blade and not allowing a new blade to operate if the total chassis power is exceeded, the blade power usage level management system of the present invention instead reserves only what is actually needed by the blade so that as many blades as possible can operate within the chassis, and more particularly, that blades of different generations can operate efficiently within the same chassis.

As an example, the following technique can be used for blades that have CPUs with at least two operational modes: a low performance mode in which a relatively low amount of power is needed, and a high performance mode in which a relatively high amount of power is needed. When the BMC 202 of a blade is powered up, the BMC 202 reports two power usage level values for the blade—one corresponding to a low power rating for the low power mode in which the blade can run, and a second corresponding to a high power rating for the blade. When a chassis controller 100 gets a request to turn on a newly inserted blade, the BMC 202 for that blade will first return the lower power rating. This will allow the blade to power up in the low performance mode. During POST (power-on self-test), the BIOS device 210 would request the BMC 202 query the chassis controller 100 for permission to switch into higher power modes. If approved by the chassis controller 100, the chassis controller 100 registers the new power rating for this specific blade and adjusts the available power for the chassis 106. The BIOS 210 then sends the appropriate commands to the CPU 208, as needed, to cause the CPU 208 to reset and begin operating in the higher performance mode. It is noted that the example above focused on power ratings that were based upon a CPU performance levels. These reduced power usage levels could also be extended to consider power reductions contributed by other configuration options, such as reduced CPU configurations, reduced hard disk configurations, reduced I/O subsystem configurations, etc.

Figure 3:
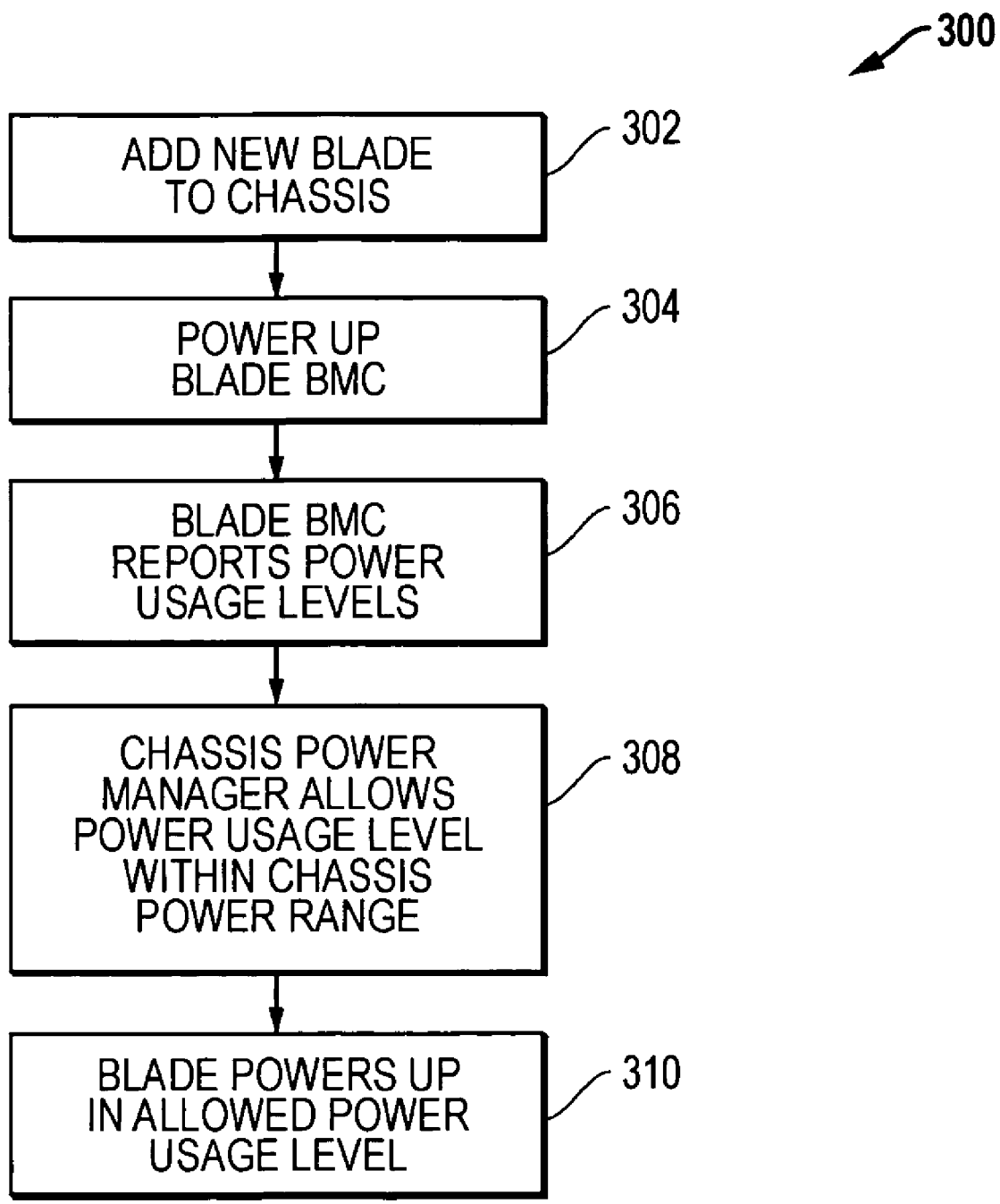
FIG. 3 is a flow diagram for managing new blades added to the blade array.

FIG. 3 is a flow diagram for managing new blades added to the blade array. In the example embodiment 300 depicted, process flow begins with block 302 where a new blade 105 is added to the chassis 106. In block 304, the BMC 202 for the blade 105 powers up, for example, using the auxiliary power rail (AUX) 108A. In block 306, the BMC 202 for the blade 105 reports one or more possible power usage levels for the blade 105 to the chassis controller 100. As discussed above, these power levels can relate to a wide variety of different performance modes and/or configuration conditions, as desired. In block 308, the chassis power manager 112 analyzes the reported power usage levels, considers the power still available for use from the chassis power supply 102, and allows the blade 105 to use a power usage level that does not cause the available power range for the chassis 106 to be exceeded. Typically, the power manager 112 is configured to allow the highest possible power usage level for the new blade 105. It is noted, however, that the power manager 112 could also be configured to select different power usage levels other then the highest allowable power usage level, depending upon the selection algorithm desired for a given implementation of the present invention. Finally, in the embodiment 300 depicted, in block 310, the blade 105 powers up using the power usage level allowed by the chassis controller 100.

Figure 4:
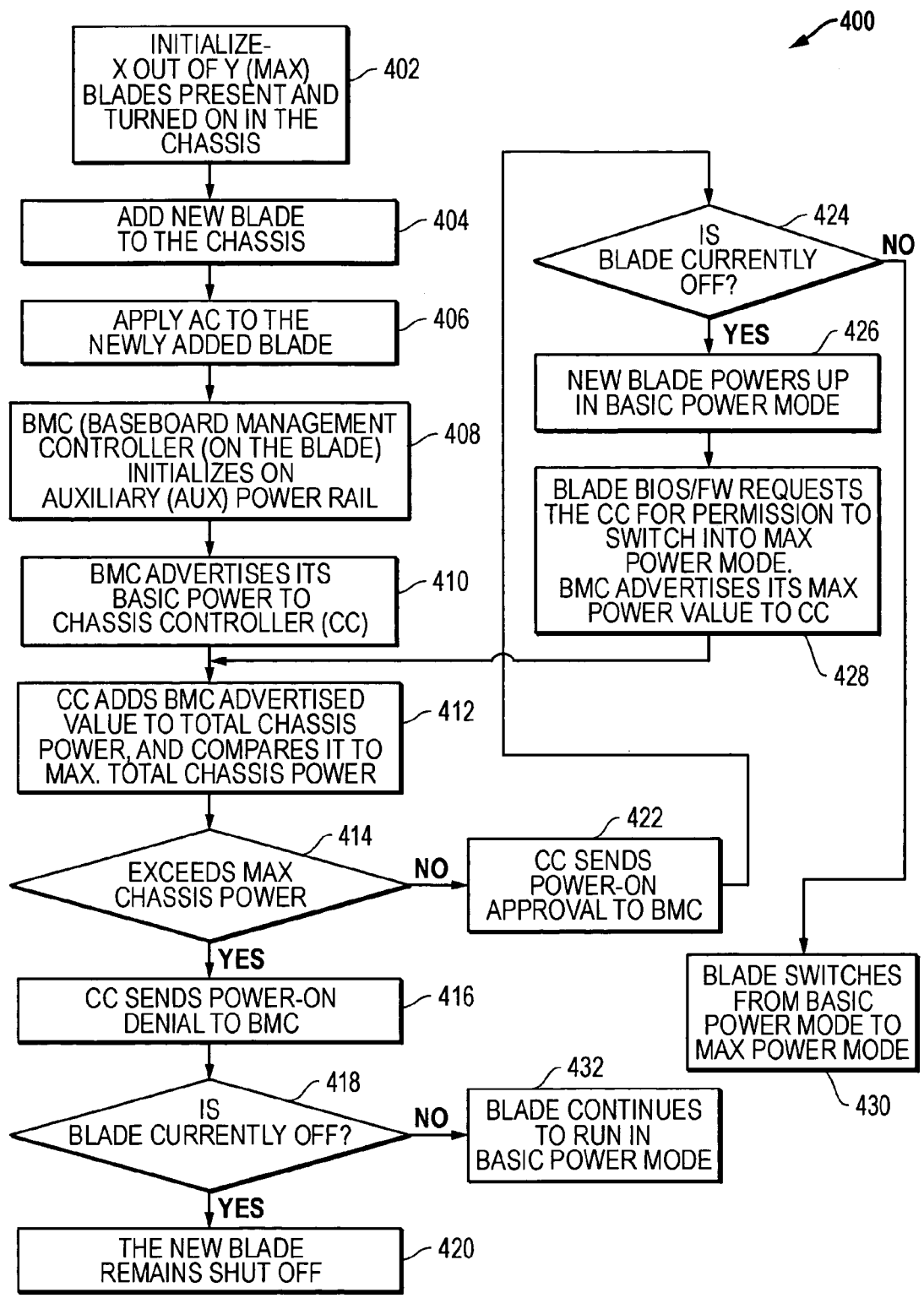
FIG. 4 is a more detailed flow diagram for managing new blades added to the blade array where the blades have two power modes of operation.

FIG. 4 is a more detailed flow diagram for managing new blades added to the blade array where the blades have two power usage levels related to two performance modes (Basic, Max). In the embodiment 400 depicted, it is assumed that a chassis 106 is configured to accept a maximum of Y blades total. It is also assumed that there are only X blades currently installed in the chassis 106, wherein X is less than Y. The process flow begins with block 402 where the X out of a possible Y (maximum) blades that are present in the chassis 106 are turned on and initialized. The chassis controller 100 would have already decided upon the power usage levels allowed for these X blades, and these X blades would typically be allowed to run in their highest performance modes. In block 404, a new blade 105 is added to the chassis 106. In block 406, alternating current (AC) power would be applied to the newly added blade 105. In block 408, the BMC 202 on the new blade 105 initializes using the auxiliary power rail (AUX) 108A. In block 410, the BMC 202 advertises or reports its basic power level to the chassis controller 100. This basic power level is related to the lower or basic performance mode for the new blade 105.

In block 412, the power manager 112 for the chassis controller (CC) 100 adds the advertised or reported value from the BMC 202 to the total chassis power. This added power usage level value can either be the basic power usage level value related to the lower performance mode from block 412 or the maximum power usage level value related to the higher performance mode from block 428. Initially, when block 412 is first reached, the new blade 105 will be in a powered down state, and the value added in block 412 will be the basic power usage level value related to the lower performance mode. Next, also in block 412, the power manager 412 compares the new total chassis power usage level (current power usage level of the X blades plus the lower power usage level for the new blade 105) to the maximum total chassis power that can be supplied by the chassis power supply 102. Decision block 414 is then reached where a determination is made as to whether the new total chassis power exceeds the maximum chassis power allowed.

If the answer in block 414 is "YES," then flow passes to block 416 where the chassis controller 100 sends a power-on denial to the BMC 202. In decision block 418, a determination is made whether the blade is currently "off." If the answer is "YES," which will be the case in the initial condition when the new blade 105 is first added to the chassis 106, then block 420 is reached, and the new blade 105 remains shut off.

If the answer in block 414 is "NO," then flow passes to block 422 where the chassis controller 100 sends a power-on approval to BMC 202. In decision block 424, a determination is made whether the blade is currently "off." If the answer is "YES," which will be the case in the initial condition when the new blade 105 is first added to the chassis 106, then block 426 is reached, and the new blade 105 powers up in its basic or lower power mode.

In block 428, the BIOS device 210 or firmware (FW) for the new blade 105 requests the chassis controller 100 for permission to switch into its maximum or higher power mode. The BMC 202 then advertises or reports to the chassis controller 100 the maximum power usage level value related to the higher performance mode for the new blade 105. Flow then passes back to block 412 where the maximum power value is added to the total chassis power (current power usage level of the X blades without the power used by the new blade 105). Decision block 414 is again reached where a determination is made as to whether the new total chassis power exceeds the maximum chassis power allowed.

If the answer in block 414 is "YES," then flow passes to block 416 where the chassis controller 100 sends a power-on denial to the BMC 202. In decision block 418, a determination is made whether the blade is currently "off." If the answer is "NO," which will be the case in the subsequent condition when the new blade 105 is already operating in its lower performance mode, then block 432 is reached, and the new blade 105 continues to run in its basic power mode.

If the answer in block 414 is "NO," then flow passes to block 422 where the chassis controller 100 sends a power-on approval to BMC 202. In decision block 418, a determination is made whether the blade is currently "off." If the answer is "NO," which will be the case in the subsequent condition when the new blade 105 is already operating in its lower performance mode, then block 430 is reached, and the new blade 105 switches from basic power mode to its maximum power mode. At this point, the power usage level control process for the new blade 105 ends.

It noted that this embodiment 400 of FIG. 4 could be expanded to cover more than two power usage levels. This could be done, for example, by having each power usage level assessed successively from lowest to highest until the maximum total power usage level for the chassis is exceeded, at which a previous power usage level is allowed, or until the highest power usage level is assessed and allowed. It is further noted that blade servers ideally operate such that each blade 104A, 104B . . . 104C, and 105 are allowed to operate at their highest performance level. However, this condition may not be possible where the chassis 106 does cannot support a full load of blades operating at their highest power usage level, as might be the case were blades of different generations are mixed together. Rather than leave empty slots in the chassis 106, however, it is often preferable to use the available slots even though this use may mean that a new blade 105 placed in one of the last slots would be left operating in its lower performance level.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method for managing power usage levels for new blades installed in a blade server, comprising:
    initializing one or more blades within a chassis for a blade server;
    adding a new blade to a chassis, the new blade configured to have two or more power usage levels;
    powering up a baseboard management controller (BMC) for the new blade without powering up a central processing unit (CPU) for the new blade;
    reporting a power usage level for the new blade from the BMC to a chassis controller, the power usage level being a level other than the maximum power usage level for the blade;
    assessing with the chassis controller a new total power usage level for the chassis based upon the reported power usage level for the new blade;
    providing instructions from the chassis controller to the BMC to allow the blade to power-up using the power usage level for the new blade if the new total power usage level for the chassis will be below a maximum total power usage level for the chassis; and
    operating the new blade using the power usage level.

2. The method of claim 1, wherein the assessing step comprises assessing the new total power usage level for the chassis based upon an addition of a power usage level for the new blade to a current total power usage level for all other blades currently installed in the chassis.

3. The method of claim 2, wherein the assessing step comprises adding together maximum power usage levels for each blade installed in the chassis to determine a current total power usage level for the chassis.

4. The method of claim 2, wherein the assessing step comprises considering actual power usage levels for each blade installed in the chassis to determine the current total power usage level for the chassis.

5. The method of claim 1, wherein the power usage levels for the new blade relate to two or more performance modes for the new blade.

6. The method of claim 1, wherein the power usage levels for the new blade relate to configuration options for the new blade.

7. The method of claim 1, further comprising receiving at the chassis controller at least one request to allow the new blade to move to a higher power usage level, assessing with the chassis controller a new total power usage level for the chassis based upon the higher power usage level for the new blade, and providing instructions from the chassis controller to allow the blade to use the higher power usage level if the new total power usage level for the chassis will be below a maximum total power usage level for the chassis.

8. The method of claim 1, wherein the reporting step comprises reporting a lowest power usage level for the new blade.

9. A method for managing power usage levels for new blades installed in a blade server, comprising:
    initializing one or more blades within a chassis for a blade server;
    adding a new blade to a chassis, the new blade configured to have two or more power usage levels;
    assessing a new total power usage level for the chassis based upon the possible power usage levels for the new blade;
    allowing a power usage level for the new blade that will keep the new total power usage level for the chassis below a maximum total power usage level for the chassis; and
    operating the new blade at the allowed power usage level;
    wherein the new blade has different power usage levels than at least one of the blades already installed in the chassis.

10. A method for managing power usage levels for new blades installed in a blade server, comprising:
    initializing one or more blades within a chassis for a blade server;
    adding a new blade to a chassis, the new blade configured to have two or more power usage levels;

assessing a new total power usage level for the chassis based upon the possible power usage levels for the new blade;

allowing a power usage level for the new blade that will keep the new total power usage level for the chassis below a maximum total power usage level for the chassis; and operating the new blade at the allowed power usage level;

wherein the assessing step comprises starting with a lowest power usage level for the new blade.

11. The method of claim 10, wherein the assessing step comprises successively assessing each power usage level for the new blade from lowest to highest until the maximum total power usage level for the chassis is exceeded, at which a previous power usage level is allowed, or until the highest power usage level is assessed and allowed.

12. The method of claim 11, wherein the new blade remains in a powered down mode if the new total power usage level would exceed the maximum total power usage level for the chassis if the new blade were to operate in the lowest power usage level.

13. A blade server having power usage level management for installed blades, comprising:

a chassis having a power supply, the chassis configured to house a plurality of blades;

a chassis power supply coupled to the chassis, the chassis power supply configured to supply power to blades installed within the chassis; and a chassis controller coupled to the chassis, the chassis controller configured to control power levels for blades installed within the chassis;

wherein the chassis controller is further configured to assess new power usage levels for the chassis based upon at least one possible power usage levels for a new blade that is capable of operating at two or more power usage levels and to allow a power usage level for the new blade that will keep the new power usage level for the chassis below a maximum total power usage level for the chassis;

wherein the chassis power supply comprises a main power rail coupled to a power supply for each blade and an auxiliary power rail coupled to a baseboard management controller (BMC) for each blade; and wherein the chassis controller is configured to communicate with the BMC for the new blade in order to instruct the new blade to stay powered-off or to power-up using the allowed power usage level if the new total power usage level for the chassis will be below a maximum total power usage level for the chassis.

14. The blade server of claim 13, wherein each blade comprises a baseboard management controller (BMC), a central processing unit (CPU) and a BIOS (basic input/output system) device.

15. The blade server of claim 14, wherein the CPU for the new blade is configured to operate in two or more performance modes, each performance mode being related to a power usage level.

16. The blade server of claim 14, wherein the BMC for the new blade is configured to report possible power usage levels for the blade to the chassis controller, and wherein the BIOS device for the new blade is configured to request approval from the chassis controller through the BMC to operate in successively higher performance modes until a request is denied.

17. A blade for a blade server having power usage level reporting, comprising:

a baseboard management controller (BMC) configured to be coupled to a chassis controller for a blade server, the BMC further configured to report to the chassis controller possible power usage levels for the blade;

a central processing unit (CPU) configured to operate in multiple performance modes, each performance mode having an associated power usage level; and a BIOS (basic input/output system) device coupled to the BMC and to the CPU, the BIOS being configured to control the performance modes of the CPU and being configured to request approval from the chassis controller through the BMC for the CPU to operate in successively higher performance modes until a request is denied;

wherein the BMC is configured to initially report to the chassis controller a lowest power usage level for the new blade and then request approval for one or more higher power usage levels.

18. The blade of claim 17, wherein the possible power usage levels for the blade further relate to configuration options for the blade in addition to performance modes of the CPU.

19. The blade of claim 17, wherein the BMC is configured to be powered separately from the CPU and the BIOS device.

* * * * *